(12) United States Patent
Choi et al.

(10) Patent No.: US 8,830,461 B2
(45) Date of Patent: Sep. 9, 2014

(54) INSPECTION APPARATUS FOR DISPLAY SUBSTRATE

(71) Applicant: Samsung Display Co., Ltd., Yongin (KR)

(72) Inventors: Suk Choi, Seongnam-si (KR); Sujin Kim, Seoul (KR); Jihong Bae, Yongin-si (KR); Heungshik Park, Seoul (KR); Hyeokjin Lee, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/904,302

(22) Filed: May 29, 2013

(65) Prior Publication Data

US 2014/0168577 A1 Jun. 19, 2014

(30) Foreign Application Priority Data

Dec. 17, 2012 (KR) .................. 10-2012-0147516

(51) Int. Cl.
*G01J 4/00* (2006.01)
*G02F 1/1347* (2006.01)
*G02F 1/1335* (2006.01)

(52) U.S. Cl.
CPC .................................. *G02F 1/1335* (2013.01)
USPC ........................................................ 356/364

(58) Field of Classification Search
CPC ................................. G01J 4/00; G02F 1/1347
USPC .......................................................... 356/364
See application file for complete search history.

(56) References Cited

U.S. PATENT DOCUMENTS

| | | | |
|---|---|---|---|
| 6,906,763 B2 * | 6/2005 | Ozeki et al. | ..................... 349/75 |
| 7,773,291 B2 | 8/2010 | Smith | |
| 2010/0177313 A1 | 7/2010 | Jun et al. | |
| 2011/0057278 A1 | 3/2011 | Kim et al. | |

FOREIGN PATENT DOCUMENTS

| | | |
|---|---|---|
| JP | 05-303068 A | 11/1993 |
| KR | 1020060092367 A | 8/2006 |
| KR | 1020080001543 A | 1/2008 |
| KR | 1020080093236 A | 10/2008 |
| KR | 1020090082737 A | 7/2009 |
| KR | 1020100095046 A | 8/2010 |

* cited by examiner

*Primary Examiner* — Roy M Punnoose
(74) *Attorney, Agent, or Firm* — Cantor Colburn LLP

(57) ABSTRACT

An inspection apparatus for a display substrate includes a reflection plate, a liquid crystal layer, an electrode layer, a ¼ wavelength retardation plate and a polarization plate. The liquid crystal layer is disposed on the reflection plate and includes liquid crystal molecules which have a retardation value of about 140 nanometers to about 200 nanometers and are operated in a twisted nematic mode. The electrode layer is disposed on the liquid crystal layer and generates an electric field in cooperation with an electrode of the display substrate. The ¼ wavelength retardation plate is disposed on the electrode layer and the polarization plate is disposed on the ¼ wavelength retardation plate.

19 Claims, 7 Drawing Sheets

INSPECTION APPARATUS FOR DISPLAY SUBSTRATE

This application claims priority to Korean Patent Application No. 10-2012-0147516, filed on Dec. 17, 2012, and all the benefits accruing therefrom under 35 U.S.C. §119, the contents of which are hereby incorporated by reference.

BACKGROUND

1. Field

The invention relates to an inspection apparatus of a display substrate. More particularly, the invention relates to an inspection apparatus of a display substrate for a liquid crystal display panel.

2. Description of the Related Art

A liquid crystal display panel is widely applied to a display device to display an image. The liquid crystal display panel includes a light source emitting light, a display substrate, an opposite substrate facing the display substrate, and a liquid crystal layer interposed between the display substrate and the opposite substrate. The liquid crystal display panel further includes electrodes used to form an electric field in the liquid crystal layer and controls a transmittance of the light passing through the liquid crystal layer using the electric field, thereby displaying the image.

The display substrate of the liquid crystal display panel includes pixel electrodes, and driving circuits, e.g., thin film transistors, electrically connected to the pixel electrodes, respectively. When the liquid crystal display panel is manufactured, the pixel electrodes and the driving circuits are required to be inspected before the display substrate and the opposite substrate are coupled to each other.

SUMMARY

One or more exemplary embodiment of the invention provides an inspection apparatus for a display substrate, which has an optimized structure to inspect the display substrate.

An exemplary embodiment of the invention provides an inspection apparatus for a display substrate including a reflection plate, a liquid crystal layer, an electrode layer, a ¼ wavelength retardation plate and a polarization plate.

The liquid crystal layer is disposed on the reflection plate and includes liquid crystal molecules which have a retardation value of about 140 nanometers (nm) to about 200 nm and which are operated in a twisted nematic mode. The electrode layer is disposed on the liquid crystal layer and generates an electric field in cooperation with an electrode of the display substrate. The ¼wavelength retardation plate is disposed on the electrode layer and the polarization plate is disposed on the ¼ wavelength retardation plate.

According to one or more exemplary embodiment of the invention, the amount of the light used to inspect defects of the display substrate, which passes through an inspection module including the above discussed elements and which is incident to a measuring unit of the inspection apparatus through the inspection module is increased, and thus defects in the display substrate may be easily detected.

In addition, since a response speed of the liquid crystal molecules of the inspection module liquid crystal layer becomes fast, the timing at which the light used to inspect defects in the display substrate is provided to the measuring unit may be precisely controlled. Thus, a noise on a data signal generated by the measuring unit may be reduced or effectively prevented.

BRIEF DESCRIPTION OF THE DRAWINGS

The above and other features of the invention will become readily apparent by reference to the following detailed description when considered in conjunction with the accompanying drawings wherein.

DETAILED DESCRIPTION

Figure 1:
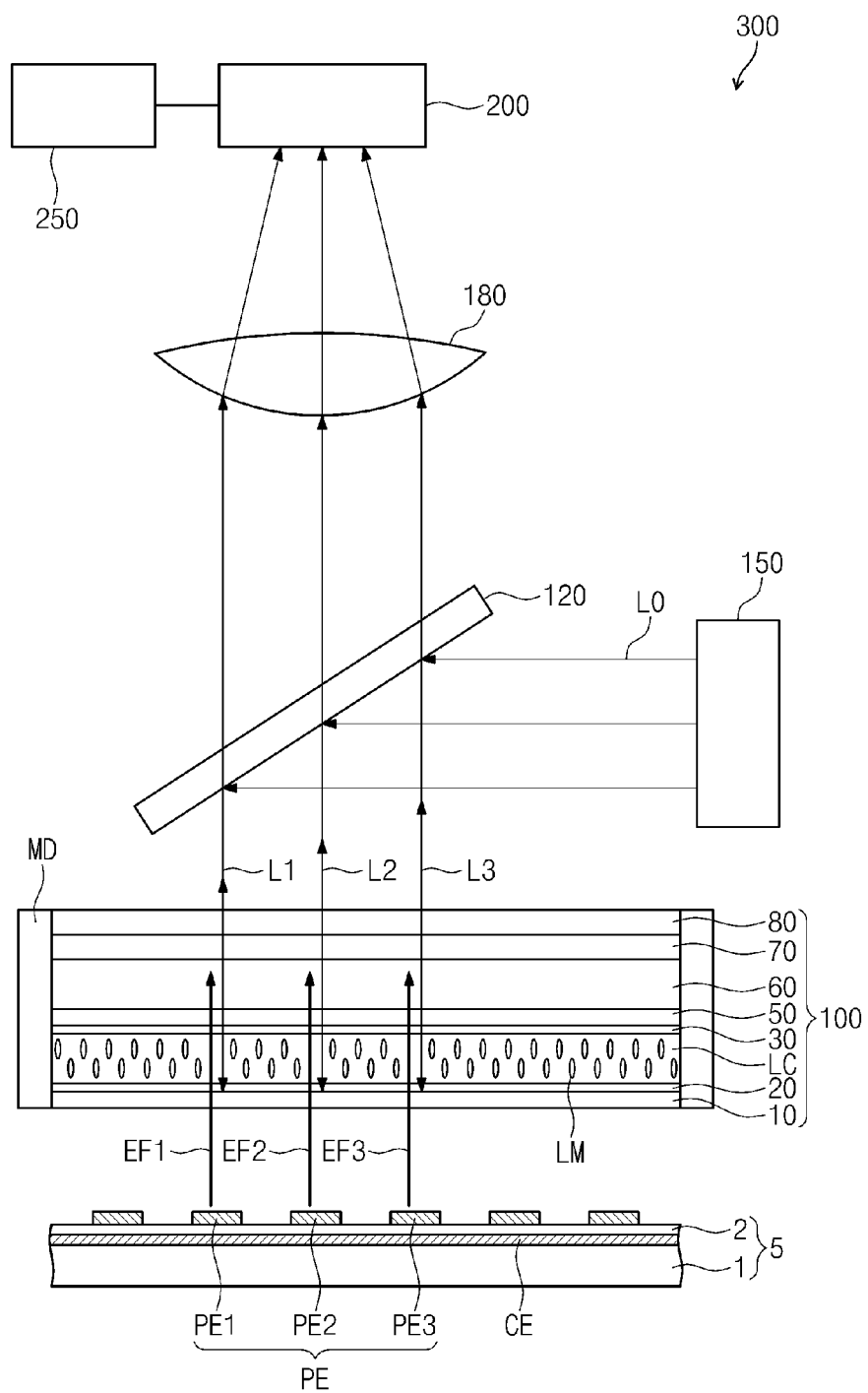
FIG. 1 is a view showing an exemplary embodiment of an inspection apparatus for a display substrate according to the invention.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2A:
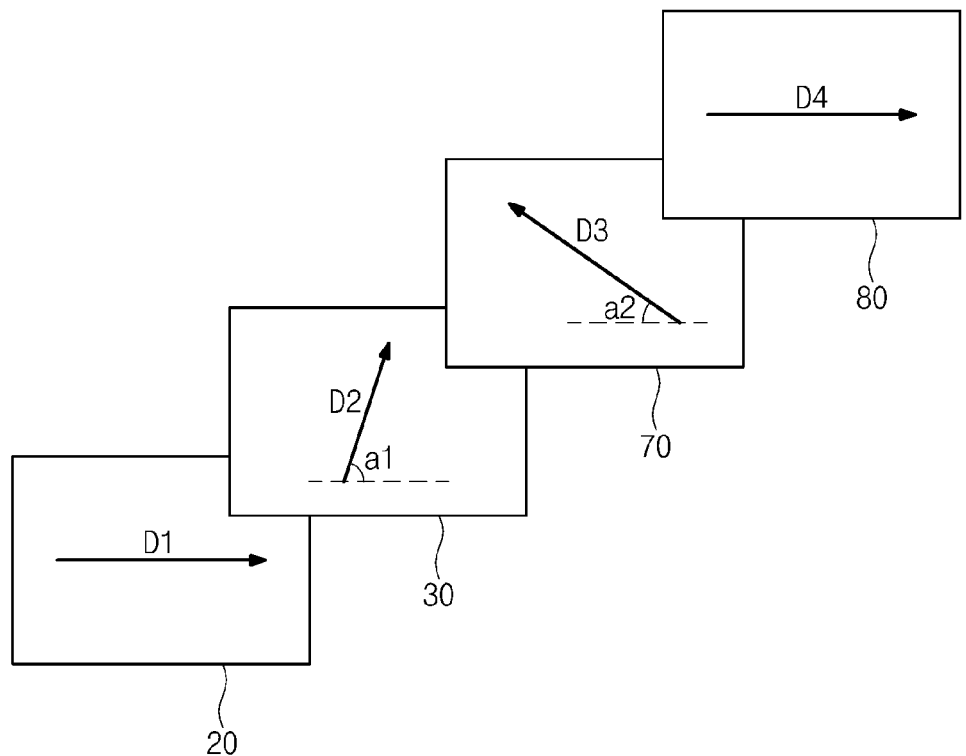
FIGS. 2A and 2B are views showing exemplary embodiments of a first alignment layer, a second alignment layer, a ¼ wavelength retardation plate and a polarization plate shown in FIG. 1.
Figure 2B:
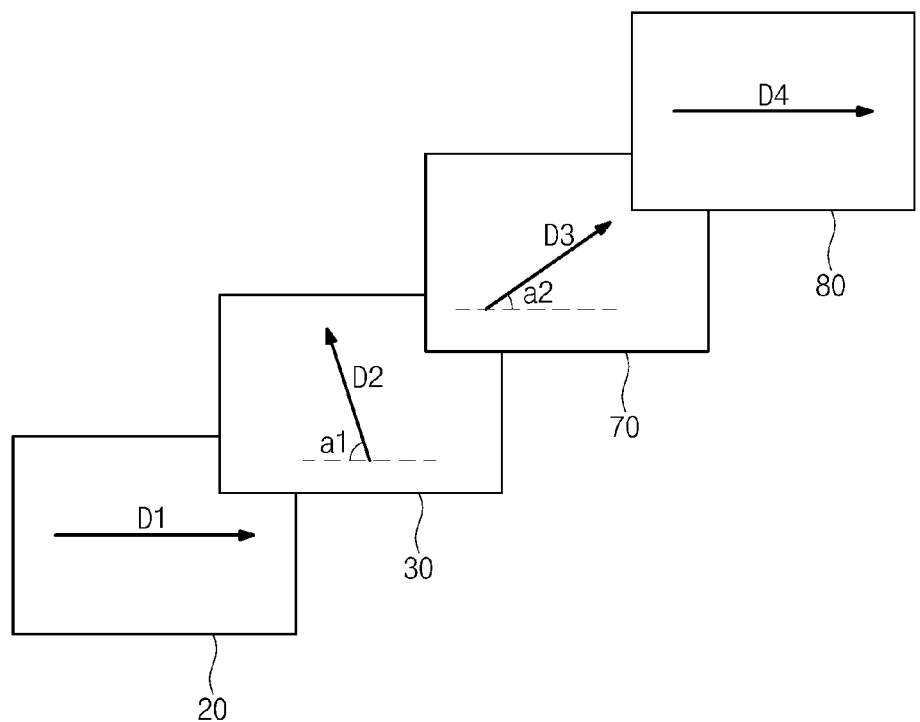

FIG. 1 is a view showing an exemplary embodiment of an inspection apparatus for a display substrate according to the invention, and FIGS. 2A and 2B are views showing exemplary embodiments of a first alignment layer, a second alignment layer, a ¼ wavelength retardation plate and a polarization plate shown in FIG. 1. Referring to FIGS. 1, 2A and 2B, the inspection apparatus 300 is used to inspect an operation of a display substrate 5. In the illustrated exemplary embodiment, the display substrate 5 inspected by the inspection apparatus 300 may include, but is not limited to, an array substrate for a liquid crystal display operated in a plane-to-line switching ("PLS") mode.

Where the display substrate 5 inspected by the inspection apparatus 300 is an array substrate for a liquid crystal display operated in the PLS mode, the display substrate 5 includes an insulating substrate 1, a common electrode CE disposed on the insulating substrate 1, an insulating layer 2 disposed on the common electrode CE, a plurality of pixel electrodes PE disposed on the insulating layer 2 and spaced apart from each other, and a plurality of driving circuits (not shown) electrically connected to the pixel electrodes PE, e.g., thin film transistors. However, the display substrate 5 should not be limited to the array substrate for the liquid crystal display operated in the PLS mode. That is, the display substrate 5 may include an array substrate for a liquid crystal display operated in a fringe field switching ("FFS") mode, a vertical alignment ("VA") mode, a twisted nematic ("TN") mode, a patterned vertical alignment ("PVA") mode or an in-plane switching ("IPS") mode.

Hereinafter, the configuration and operation of the inspection apparatus 300 used to inspect an operation of the display substrate 5 will be described in detail. In the illustrated exemplary embodiment, the inspection apparatus 300 includes a light emitting unit 150, a beam splitter 120, an inspection module 100, a condensing member 180, a measuring unit 200 and an image processing unit 250.

The light emitting unit 150 emits a light L0. The light emitting unit 150 includes a light source which generates the light L0, e.g., a light emitting diode, a cold cathode fluorescent lamp, etc., and emits the light L0, and a light guide member, e.g., a light guide plate, to guide the light L0 to the beam splitter 120.

The beam splitter 120 splits the light L0 provided from the light emitting unit 150 and provides the split light to the inspection module 100. In the illustrated exemplary embodiment, for instance, the light L0 is split into first, second and third lights L1, L2 and L3 by the beam splitter 120 and the first to third lights L1 to L3 are provided to the inspection module 100 through the beam splitter 120. The first, second, and third lights L1, L2, and L3 travel from the beam splitter 120 to correspond to first, second and third pixel electrodes PE1, PE2 and PE3 of the display substrate 5, respectively.

The beam splitter 120 may split the light L0 into plural lights, but the first to third lights L1 to L3 are shown in FIG. 1 among the light as a representative example and the others will be omitted.

The inspection module 100 is disposed between the beam splitter 120 and the display substrate 5 to be inspected. The inspection module 100 includes a mold MD, a reflection plate 10, a first alignment layer 20, a liquid crystal layer LC, a second alignment layer 30, an electrode layer 50, a substrate 60, a ¼ wavelength retardation plate 70 and a polarization plate 80.

The mold MD is coupled with the remaining above-mentioned elements of the inspection module 100 and is opened at upper and lower portions thereof. One or more of the remaining above-mentioned elements of the inspection module 100 are exposed by the opened upper and/or lower potions of the mold MD. Accordingly, an intensity of first, second and third electric fields EF1, EF2 and EF3 generated between the inspection module 100 and the display substrate 5 is not reduced, and the first to third lights L1 to L3 are not blocked.

The reflection plate 10 reflects the first to third lights L1 to L3 passing through the beam splitter 120 and the liquid crystal layer LC, toward the beam splitter 120. In the illustrated exemplary embodiment, the reflection plate 10 includes a dielectric material having a dielectric constant of about zero (0) or less than about 6. Thus, the intensity and direction of the first to third electric fields EF1 to EF3 may not be changed by the reflection plate 10.

The first alignment layer 20 is disposed above the reflection plate 10 and arranged between the reflection plate 10 and the liquid crystal layer LC. The first alignment layer 20 includes an insulating material with a light transmission property. When no electric field is formed between the electrode layer 50 and the pixel electrodes PE, the first alignment layer 20 aligns first liquid crystal molecules M1 (refer to FIG. 3A) which are disposed adjacent to the first alignment layer 20 among the liquid crystal molecules LM of the liquid crystal layer LC, in a first direction D1. In a method of manufacturing a liquid crystal display, the first alignment layer 20 is rubbed along the first direction D1.

The second alignment layer 30 is disposed below the electrode layer 50 and arranged between the electrode layer 50 and the liquid crystal layer LC. The second alignment layer 30 includes an insulating material with a light transmission property. When no electric field is formed between the electrode layer 50 and the pixel electrodes PE, the second alignment layer 30 aligns second liquid crystal molecules M2 which are disposed adjacent to the second alignment layer 30 among the liquid crystal molecules LM of the liquid crystal layer LC, in a second direction D2. In an exemplary embodiment of manufacturing a liquid crystal display, the second alignment layer 30 is rubbed along the second direction D2. A first angle a1 formed between the first direction D1 and the second direction D2 is in a range from about 60 degrees to about 90 degrees, and in one exemplary embodiment may be about 72 degrees.

The liquid crystal layer LC includes the liquid crystal molecules LM. In the illustrated exemplary embodiment, the liquid crystal molecules LM are operated in the TN mode and have a positive dielectric anisotropy. Thus, when the electric field is not formed between the electrode layer 50 and the pixel electrodes PE, the liquid crystal molecules LM are successively twisted from the first direction D1 to the second direction D2 when viewed in a plan view. The liquid crystal molecules LM will be described in detail with reference to FIGS. 3A and 3B.

The electrode layer 50 of the inspection module 100 is disposed above the liquid crystal layer LC, and forms the electric field in the liquid crystal layer LC in cooperation with the pixel electrodes PE of the display substrate 5. The electrode layer 50 includes a transparent conductive material, e.g., indium tin oxide, indium zinc oxide, etc., to allow the first to third lights L1 to L3 to pass through the electrode layer 50.

The substrate 60 faces the reflection plate 10 while interposing the liquid crystal layer LC therebetween. In the illustrated exemplary embodiment, the electrode layer 50 may be disposed below the substrate 60 and the substrate 60 may include a transparent glass or plastic substrate, such that the first to third lights L1 to L3 transmits through the substrate 60.

The ¼ wavelength retardation plate 70 is disposed above the substrate 60. The ¼ wavelength retardation plate 70 has a delay axis D3 to delay the light vibrating along the delay axis D3. In the illustrated exemplary embodiment, the ¼ wavelength retardation plate 70 has a retardation value of about 120 nanometers (nm) to about 160 nm. A second angle a2 formed between the delay axis D3 and an optical axis D4 of the polarization plate 80 or between the delay axis D3 and the first direction D1 is in a range from about 37 degrees to about 52 degrees, and in one exemplary embodiment may be about 45 degrees. When the first to third pixel electrodes PE1 to PE3 are normally operated, the ¼ wavelength retardation plate 70 reduces a difference between light amounts of the first to third lights L1 to L3, which are reflected by the reflection plate 10 and incident into the measuring unit 200.

As shown in FIG. 2A, where the first angle a1 is defined by rotating the second direction D2 in a counter-clockwise direction with respect to the first direction D1, the second angle a2 is defined by rotating the delay axis D3 in a clockwise direction with respect to the first direction D1. In addition, as shown in FIG. 2B, where the first angle a1 is defined by rotating the second direction D2 in the clockwise direction with respect to the first direction D1, the second angle a2 is defined by rotating the delay axis D3 in the counter-clockwise direction with respect to the first direction D1.

The polarization plate 80 is disposed above the ¼ wavelength retardation plate 70. The polarization plate 80 has the optical axis D4 substantially parallel to the first direction D1. In the illustrated exemplary embodiment, the optical axis D4 may be a transmission axis or an absorption axis of the polarization plate 80. In addition, the polarization plate 80 has a haze value of 0% to about 5%. When the haze value of the polarization plate 80 exceeds about 5%, the light passing through the polarization plate 80 is more diffused, so that an amount of the light provided to the condensing member 180 after passing through the polarization plate 80 is reduced. Accordingly, in exemplary embodiments of the invention, the haze value of the polarization plate 80 is greater than 0% and less than 5%, such as being closer to 0%.

The condensing member 180 is disposed on the beam splitter 120 and condenses the first to third lights L1 to L3 reflected by the reflection plate 10 and passing through the inspection module 100. The condensing member 180 may include a convex lens, but is not limited thereto or thereby.

The first to third lights L1 to L3 condensed by the condensing member 180 are provided to the measuring unit 200. The measuring unit 200 includes a plurality of charge-coupled devices ("CCDs"). The measuring unit 200 generates data signals corresponding to the light amounts of the first to third lights L1 to L3 in a one-to-one correspondence using the CCDs. In one exemplary embodiment, the first to third lights L1 to L3 are provided to three CCDs, respectively, among the CCDs.

The image processing unit 250 converts the data signals generated by the measuring unit 200 to images which may be displayed and viewed by a user. Thus, an operator may monitor whether the first to third pixel electrodes PE1 to PE3 are normal by using the images generated by the image processing unit 250.

The first electric field EF1 is formed between the electrode layer 50 and the first pixel electrode PE1, the second electric field EF2 is formed between the electrode layer 50 and the second pixel electrode PE2, and the third electric field EF3 is formed between the electrode layer 50 and the third pixel electrode PE3. An exemplary embodiment of an inspection method for inspecting the operation of the display substrate 5 by the inspection apparatus 300 is as follows.

In an exemplary embodiment, for instance, a voltage of about 150 volts is applied to the electrode layer 50 and a voltage of about 10 volts is applied to the driving circuits electrically connected to the first to third pixel electrodes PE1 to PE3 in a one-to-one correspondence. When a pixel electrode or the driving circuit electrically connected to the pixel electrode is defective, an intensity of the electric field generated using the defective pixel electrode or driving circuit may be less than that of other electric fields generated with a non-defective pixel electrode or driving circuit. Referring to FIG. 1, for example, if the second pixel electrode PE2 or the driving circuit electrically connected to the second pixel electrode PE2 has defects, the intensity of the second electric field EF2 is smaller than that of each of the first electric field EF1 and the third electric field EF2. Therefore, an amount of the second light L2 passing through a portion of the liquid crystal layer LC, which is influenced by the second electric field EF2, is smaller than an amount of the first and third lights L1 and L3 passing through the other portions of the liquid crystal layer LC, which are influenced by the first and third electric fields EF1 and EF3. As a result, the amount of the second light L2 reaching the measuring unit 200 is smaller than the amount of each of the first and third lights L1 and L3 reaching the measuring unit 200.

Thus, when the data signals respectively corresponding to the light amounts of the first to third lights L1 to L3 are generated by the measuring unit 200 and the images respectively corresponding to the data signals are generated by the image processing unit 250, an image based on the light amount of the second light L2 among the images is displayed as a picture different from pictures of the other images based on the light amounts of the first and third lights L1 and L3. Therefore, the operator compares the pictures of the images with each other and determines that the defects are generated in the second pixel electrode PE2 or the driving circuit electrically connected to the second pixel electrode PE2.

Hereinafter, a structure of the liquid crystal layer LC will be described in detail with reference to FIGS. 3A and 3B.

Figure 3A:
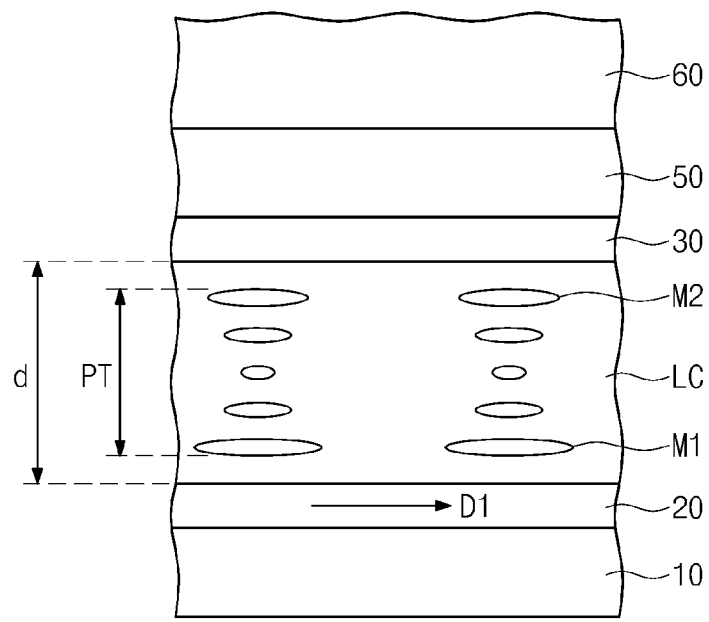
FIG. 3A is a cross-sectional view showing an exemplary embodiment of liquid crystal molecules shown in FIG. 1, which are not influenced by an electric field.
Figure 3B:
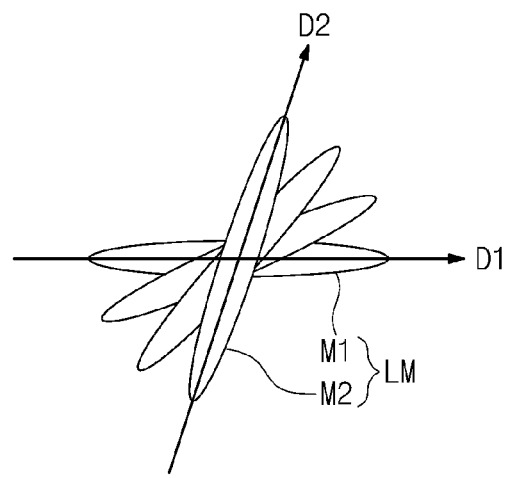
FIG. 3B is a plan view showing the liquid crystal molecules shown in FIG. 3A.

FIG. 3A is a view showing an exemplary embodiment of the liquid crystal molecules shown in FIG. 1, which are not influenced by an electric field, and FIG. 3B is a plan view showing the liquid crystal molecules shown in FIG. 3A.

Referring to FIGS. 3A and 3B, the liquid crystal molecules LM are operated in the TN mode. Accordingly, when the first to third electric fields EF1 to EF3 are not generated, the first liquid crystal molecules M1 disposed adjacent to the first alignment layer 20 among the liquid crystal molecules LM are aligned substantially parallel to the first direction D1 by the first alignment layer 20. In addition, the second liquid crystal molecules M2 disposed adjacent to the second alignment layer 30 among the liquid crystal molecules LM are aligned substantially parallel to the second direction D2 by the second alignment layer 30. In the illustrated exemplary embodiment, the first angle a1 between the first direction D1 and the second direction D2 is in the range from about 60 degrees to about 90 degrees, and in one exemplary embodiment may be about 72 degrees.

In addition, when the first to third electric fields EF1 to EF3 are not generated, a twisted pitch PT in which the liquid crystal molecules LM are twisted is in a range from about 30 micrometers to about 60 micrometers. The twisted pitch PT may be controlled by using an amount of chiral dopants included in the liquid crystal layer LC. As the twisted pitch PT becomes small in the above-mentioned range, an attractive force between the liquid crystal molecules LM successively twisted in the twisted pitch PT increases. Therefore, the response speed of the liquid crystal molecules LM may be improved with respect to the first to third electric fields EF1 to EF3. This will be described in detail with reference to FIG. 5.

In the illustrated exemplary embodiment, the liquid crystal molecules LM have the positive dielectric anisotropy. Thus, when the first to third electric fields EF1 to EF3 are generated, the liquid crystal molecules LM are aligned substantially parallel to the first to third electric fields EF1 to EF3 as shown in FIG. 1, and thus the first to third lights L1 to L3 may transmit through the liquid crystal layer LC.

In addition, the retardation value (dΔn) of the liquid crystal layer LC is in a range from about 140 nm to about 200 nm. The retardation value (dΔn) is defined by a cross-sectional thickness (d) of the liquid crystal layer LC (refer to 'd' in FIG. 3A) and a refractive anisotropy (Δn) of the liquid crystal layer LC. Where the retardation value (dΔn) of the liquid crystal layer LC is controlled in the above-mentioned range, the amount of the first to third lights L1 to L3, which are reflected by the reflection plate 10 and measured by the measuring unit 200, may be improved. This will be described in detail with reference to FIG. 4.

Figure 4:
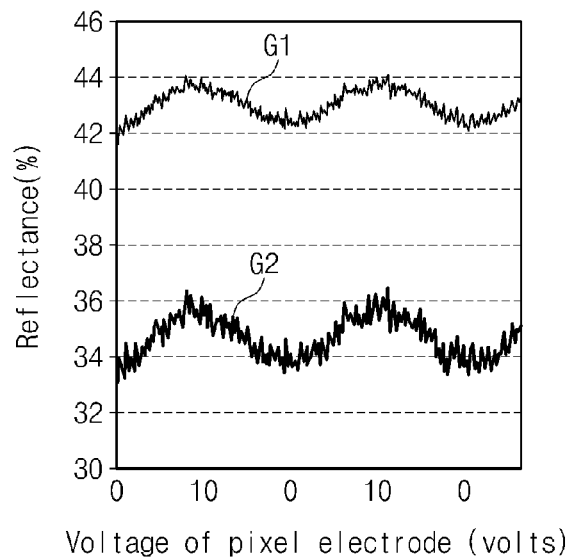
FIG. 4 is a graph showing a reflectance in percent (%) with respect to a voltage in volts of a pixel electrode for an exemplary embodiment of an inspection module according to the invention and a comparison example of an inspection module.

FIG. 4 is a graph showing a reflectance in percent (%) with respect to a voltage in volts of a pixel electrode for an exemplary embodiment of an inspection module according to the invention and a comparison example of an inspection module.

Referring to FIGS. 1 and 4, an x-axis indicates the voltage applied to the first to third pixel electrodes PE1 to PE3 of the display substrate 5 and a y-axis indicates the reflectance. The reflectance indicates a ratio of the amount of the light L0 generated by the light emitting unit 150 to the amount of the first to third lights L1 to L3 reflected by the reflection plate 10 and measured by the measuring unit 200 when the first to third EF1 to EF3 are generated.

In addition, a first graph G1 represents the reflectance measured by the exemplary embodiment of the inspection module 100 according to the invention described with reference to FIGS. 1, 2A, and 2B. A second graph G2 represents the reflectance measured by an inspection module different from the exemplary embodiment of the inspection module 100 according to the invention, in which the retardation value of the liquid crystal layer is set to about 400 nm and the ¼ wavelength retardation plate 70 is omitted.

As represented by the first graph G1, when the voltage of about zero (0) volts is applied to the first to third pixel electrodes PE1 to PE3 and the voltage of about 150 volts is applied to the electrode layer 50, the reflectance is about 42%. In addition, when the voltage of about 10 volts is applied to the first to third pixel electrodes PE1 to PE3 and the voltage of about 150 volts is applied to the electrode layer 50, the reflectance is about 44%.

As represented by the second graph G2, when the voltage of about zero (0) volts is applied to the first to third pixel electrodes PE1 to PE3 and the voltage of about 150 volts is applied to the electrode layer 50, the reflectance is about 34%. In addition, when the voltage of about 10 volts is applied to the first to third pixel electrodes PE1 to PE3 and the voltage of about 150 volts is applied to the electrode layer 50, the reflectance is about 36%.

In the first and second graphs G1 and G2, the voltage of about zero (0) volts is applied to the first to third pixel electrodes PE1 to PE3 on the assumption that the first to third pixels PE1 to PE3 or the driving circuits electrically connected to the first to third pixel electrodes PE1 to PE3 are operated abnormally. The voltage of about 10 volts is applied to the first to third pixel electrodes PE1 to PE3 on the assumption that the first to third pixels PE1 to PE3 or the driving circuits electrically connected to the first to third pixel electrodes PE1 to PE3 are operated normally.

According to the first and second graphs G1 and G2, when the exemplary embodiment of the inspection module 100 according to the invention is applied to the inspection apparatus 300 for a display substrate, the reflectance is improved by about 17%. This means that the amount of the first to third lights L1 to L3 incident to the measuring unit 200 is increased when the exemplary embodiment of the inspection module 100 is applied to the inspection apparatus 300, and thus the measuring unit 200 may precisely generate the data signals on the basis of the amount of the first to third lights L1 to L3. As a result, the difference between the data signals may be reduced and a noise may be reduced or effectively prevented.

In addition, when the amount of the first to third lights L1 to L3 incident to the measuring unit 200 increases, a contrast ratio of the images generated by the image processing unit 250 on the basis of the data signals may be improved by about 10% as compared to that of the comparison example represented by the second graph G2.

Figure 5:
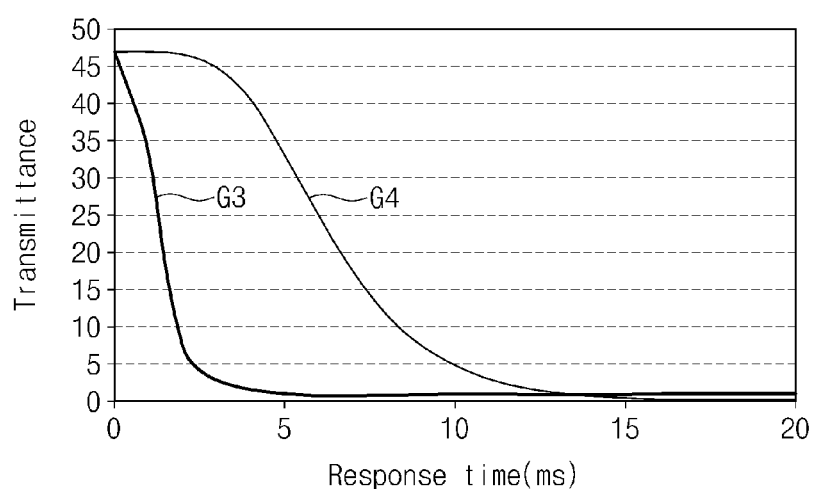
FIG. 5 is a graph showing a relative transmittance with respect to a response time in milliseconds (ms) for an exemplary embodiment of an inspection module according to the invention and a comparison example of an inspection module.

FIG. 5 is a graph showing a relative transmittance with respect to a response time in milliseconds (ms) for an exemplary embodiment of an inspection module according to the invention and a comparison example of an inspection module.

In FIG. 5, an x-axis indicates the response time of the liquid crystal molecules LM and a y-axis indicates the transmittance. The transmittance represents the amount of the first to third lights L1 to L3 passing through the liquid crystal layer LC while the liquid crystal molecules LM respond once to the first to third electric fields EF1 to EF3.

In addition, a third graph G3 represents the transmittance measured by an exemplary embodiment of the inspection module 100 according to the invention described with reference to FIGS. 1, 2A, and 2B, and a fourth graph G4 represents the transmittance measured by a comparison example of an inspection module including liquid crystal molecules with a pitch of about 70 micrometers.

As represented by the third graph G3, the response time during which the liquid crystal molecules LM respond once is about 6 ms. In contrast, as represented by the fourth graph G4, when the pitch of the liquid crystal molecules LM is greater than that of the illustrated exemplary embodiment, the response time is about 13 ms. Thus, the response speed of the liquid crystal molecules LM represented by the third graph G3 is about two times faster than that of the comparison example represented by the fourth graph G4. As a result, a timing at which the first to third lights L1 to L3 are incident to the measuring unit 200 may be precisely controlled, thereby reducing or effectively preventing the noise from occurring on the data signals generated by the measuring unit 200.

Figure 6:
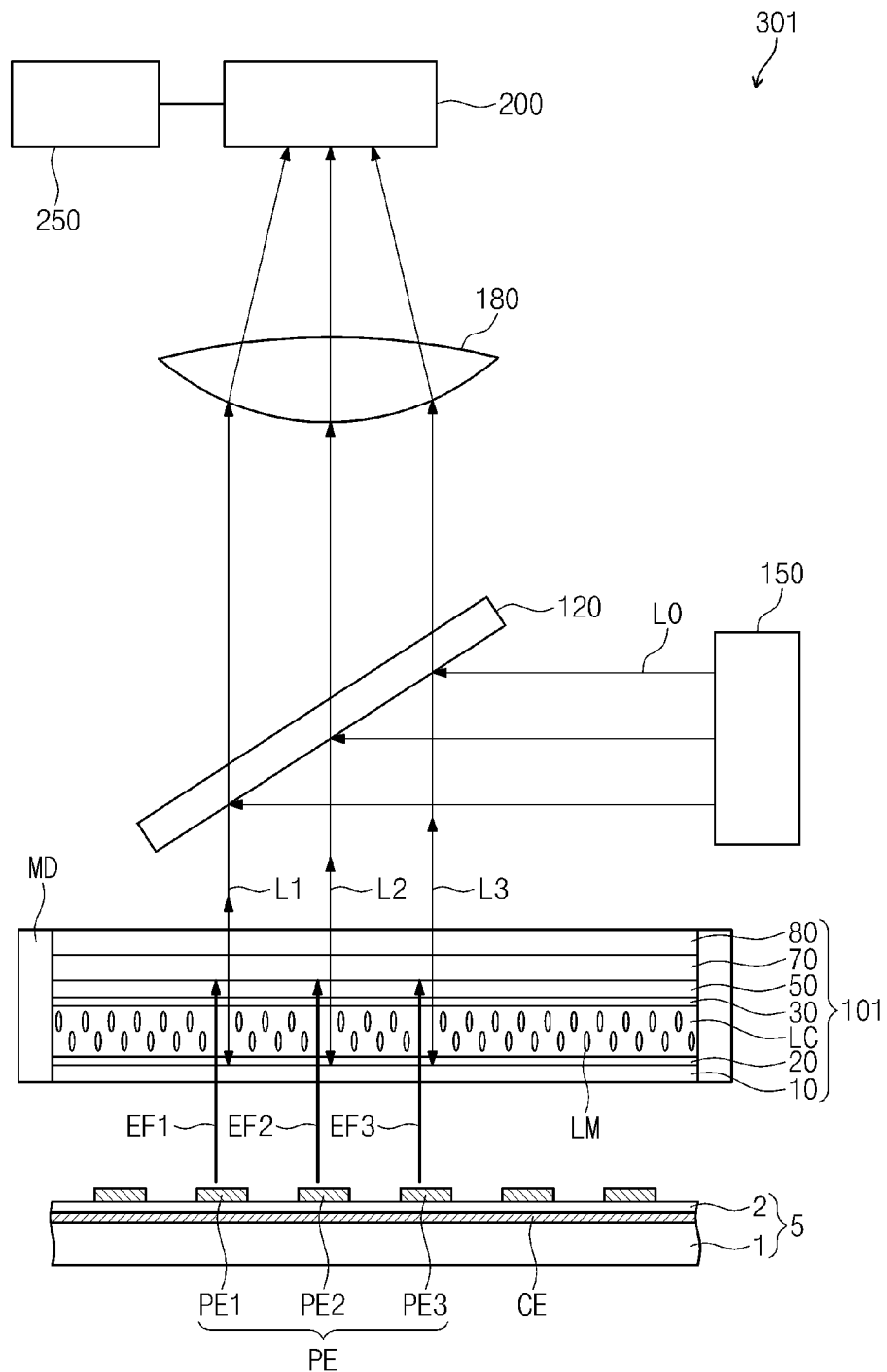
FIG. 6 is a view showing another exemplary embodiment of an inspection apparatus for a display substrate according to the invention.

FIG. 6 is a view showing another exemplary embodiment of an inspection apparatus of for display substrate according to the invention. The inspection apparatus 301 shown in FIG. 6 has substantially the same structure and function as those of the inspection apparatus 300 shown in FIG. 1 except for an inspection module 101. In FIG. 6, the same reference numerals denote the same elements shown in FIG. 1, and thus detailed descriptions of the same elements will be omitted.

Referring to FIG. 6, the inspection apparatus 301 includes the inspection module 101. As compared to the inspection module 100 shown in FIG. 1, the substrate 60 shown in FIG. 1 is removed from the inspection module 101 and the electrode layer 50 is disposed on the ¼ wavelength retardation plate 70 to be disposed between the ¼ wavelength retardation plate 70 and the liquid crystal layer LC. Accordingly, loss of an amount of the first to third lights L1 to L3 which is caused when the first to third lights L1 to L3 transmit through the substrate 60 may be reduced or effectively prevented, since the substrate 60 is omitted in the illustrated exemplary embodiment of FIG. 6.

Figure 7:
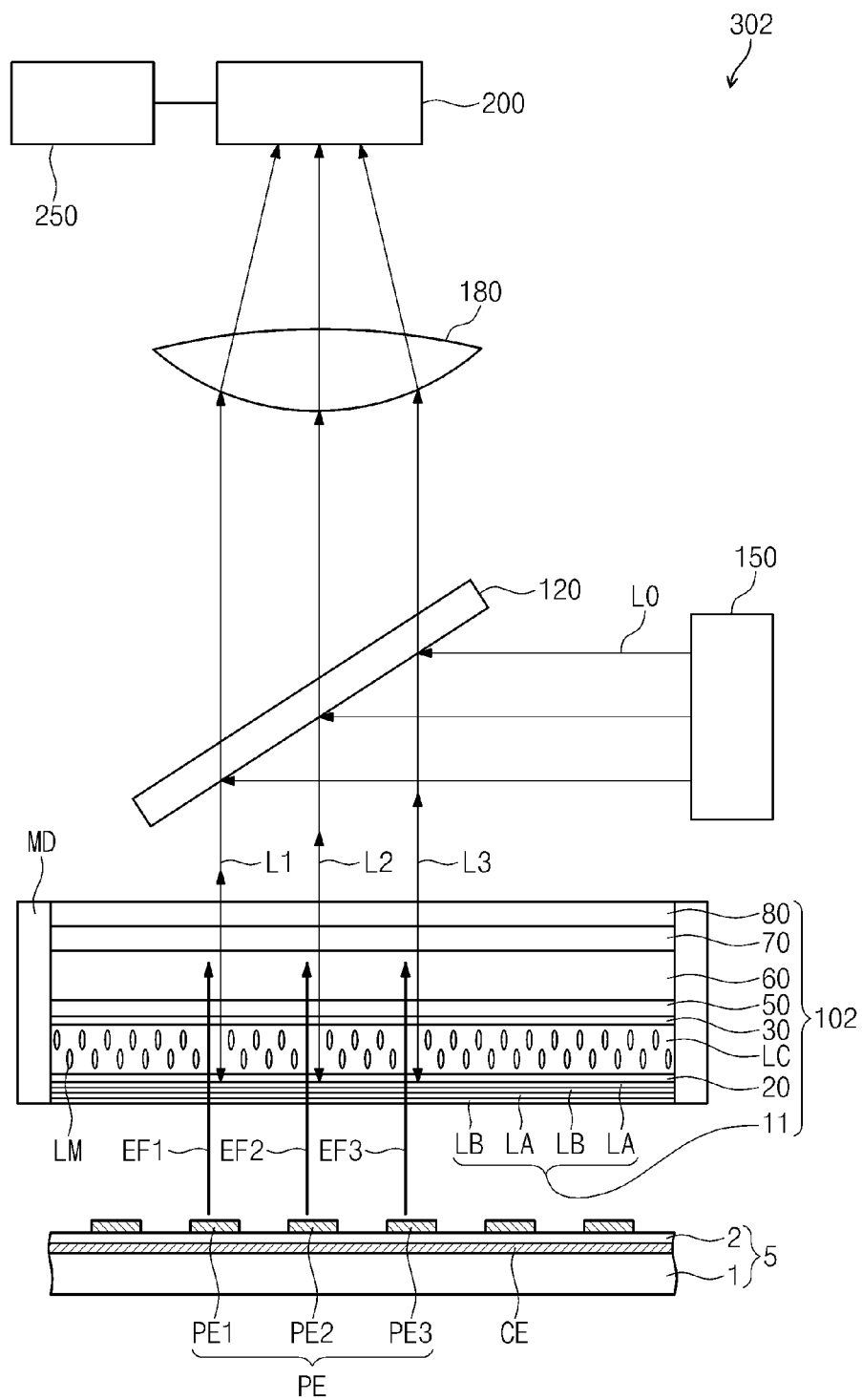
FIG. 7 is a view showing still another exemplary embodiment of an inspection apparatus for a display substrate according to the invention.

FIG. 7 is a view showing still another exemplary embodiment of an inspection apparatus for a display substrate according to the invention. The inspection module 102 shown in FIG. 7 has substantially the same structure and function as those of the inspection module 100 300 shown in FIG. 1 except for a reflection plate 11. In FIG. 7, the same reference numerals denote the same elements shown in FIG. 1, and thus detailed descriptions of the same elements will be omitted.

Referring to FIG. 7, an inspection apparatus 302 includes the inspection module 102 and the inspection module 102 includes the reflection plate 11. In the illustrated exemplary embodiment, the reflection plate 11 includes a plurality of layers having different refractive indices and reflects the first to third lights L1 to L3 using a total reflection generated by a difference between the refractive indices.

The reflection plate 11 includes a first layer LA having a first refractive index and a second layer LB disposed on the first layer LA and having a second refractive index smaller than the first refractive index. The first and second layers LA and LB are alternately and repeatedly stacked to form the reflection plate 11. Therefore, when an incident angle of the first to third lights L1 to L3 incident to the reflection plate 11 is greater than a critical angle defined by the first and second refractive indices, the first to third lights L1 to L3 may be totally reflected at an interface between the first layer LA and the second layer LB.

In the illustrated exemplary embodiment, the first and second layers LA and LB include an inorganic insulating material. In detail, the first layer LA includes titanium oxide and the second layer LB includes silicon oxide or silicon nitride, which has a refractive index smaller than that of the first layer LA.

According to another exemplary embodiment of the reflection plate 11, the first and second layers LA and LB include an organic insulating material. Where the first and second layers LA and LB include an organic insulating material, the first layer LA includes polyethylene terephthalate ("PET") and the second layer LB includes polymethyl methacrylate ("PMMA"), which has a refractive index smaller than that of the first layer LA.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. An inspection apparatus of inspecting a display substrate, comprising:
   a reflection plate;
   a liquid crystal layer on the reflection plate and comprising liquid crystal molecules, wherein the liquid crystal molecules have a retardation value of about 140 nanometers to about 200 nanometers and are operated in a twisted nematic mode;
   an electrode layer on the liquid crystal layer, wherein the electrode layer generates an electric field in cooperation with an electrode of the display substrate;
   a ¼ wavelength retardation plate on the electrode layer; and
   a polarization plate on the ¼ wavelength retardation plate.

2. The inspection apparatus of claim 1, wherein
   the liquid crystal molecules are twisted from a first direction to a second direction when the electric field is not generated, and
   a first angle between the first direction and the second direction is in a range from about 60 degrees to about 90 degrees.

3. The inspection apparatus of claim 2, wherein the first angle is about 72 degrees.

4. The inspection apparatus of claim 2, wherein the liquid crystal molecules have a twisted pitch of from about 30 micrometers to about 60 micrometers when the electric field is not generated.

5. The inspection apparatus of claim 3, further comprising:
   a first alignment layer between the reflection plate and the liquid crystal layer, wherein the first alignment layer aligns the liquid crystal molecules in the first direction; and
   a second alignment layer between the electrode layer and the liquid crystal layer, wherein the second alignment layer aligns the liquid crystal molecules in the second direction.

6. The inspection apparatus of claim 5, wherein the polarization plate has an optical axis substantially parallel to the first direction.

7. The inspection apparatus of claim 6, wherein the optical axis is one of an absorption axis and a transmission axis.

8. The inspection apparatus of claim 6,
   wherein the ¼ wavelength retardation plate comprises a delay axis, and
   a second angle between the delay axis of the ¼ wavelength retardation plate and the optical axis of the polarization plate is in a range from about 37 degrees to about 52 degrees in a plan view.

9. The inspection apparatus of claim 8, wherein
   the first angle is defined by rotating the second direction in a counter-clockwise direction with respect to the first direction, and
   the second angle is defined by rotating the delay axis in a clockwise direction with respect to the first direction.

10. The inspection apparatus of claim 8, wherein
the first angle is defined by rotating the second direction in a clockwise direction with respect to the first direction, and
the second angle is defined by rotating the delay axis in a counter-clockwise direction with respect to the first direction.

11. The inspection apparatus of claim 1, wherein the ¼ wavelength retardation plate has a retardation value of about 120 nanometers to about 160 nanometers.

12. The inspection apparatus of claim 1, further comprising a substrate facing the reflection plate,
wherein the liquid crystal layer is between the substrate and the reflection plate, and the electrode layer is between the substrate and the liquid crystal layer.

13. The inspection apparatus of claim 1, wherein the electrode layer is between the retardation plate and the liquid crystal layer.

14. The inspection apparatus of claim 1, further comprising:
a light emitting unit which generates and emits a light;
a measuring unit which measures an amount of the light passing through the liquid crystal layer after being reflected by the reflection plate, and generates a data signal based on the measured amount of the light; and
an image processing unit which converts the data signal to an image.

15. The inspection apparatus of claim 1, wherein the display substrate is a substrate of a liquid crystal display panel which is operated in a plane-to-line switching mode.

16. The inspection apparatus of claim 1, wherein a haze value of the polarization plate is in a range from 0% to about 5%.

17. The inspection apparatus of claim 1, wherein a dielectric constant of the reflection plate is in a range of zero (0) to about 6.

18. The inspection apparatus of claim 1, wherein the reflection plate comprises:
a first layer having a first refractive index; and
a second layer on the first layer, the second layer having a second refractive index different from the first refractive index.

19. The inspection apparatus of claim 18, wherein the reflection plate comprises a plurality of first layers and second layers alternated with each other.

* * * * *